(12) United States Patent
Kang et al.

(10) Patent No.: US 7,405,723 B2
(45) Date of Patent: Jul. 29, 2008

(54) APPARATUS FOR TESTING DISPLAY DEVICE AND METHOD FOR TESTING THE SAME

(75) Inventors: Pil-Sung Kang, Gyeongsangbook-Do (KR); Hyun-Taek Nam, Gyeongsangbook-Do (KR)

(73) Assignee: LG Display Co., Ltd., Seoul (KR)

( * ) Notice: Subject to any disclaimer, the term of this patent is extended or adjusted under 35 U.S.C. 154(b) by 721 days.

(21) Appl. No.: 10/855,362

(22) Filed: May 28, 2004

(65) Prior Publication Data

US 2005/0005220 A1 Jan. 6, 2005

(30) Foreign Application Priority Data

Jun. 30, 2003 (KR) .................. 10-2003-0043970

(51) Int. Cl.
*G09G 5/00* (2006.01)
*H04N 17/00* (2006.01)
*G01R 31/28* (2006.01)

(52) U.S. Cl. ............... 345/156; 345/520; 345/594; 345/904; 348/75; 348/180; 348/184; 714/36; 714/715; 714/740; 702/67; 702/68

(58) Field of Classification Search ........... 345/502, 345/520, 522, 810, 904, 156, 184, 594; 348/75, 348/94, 95, 177–184; 700/6, 17, 26, 39, 700/75; 702/26, 67–76, 119–123; 725/34, 725/45, 52, 90; 714/30, 36, 46, 715, 740–742
See application file for complete search history.

(56) References Cited

U.S. PATENT DOCUMENTS

| | | | | |
|---|---|---|---|---|
| 5,646,521 A | * | 7/1997 | Rosenthal et al. | 324/158.1 |
| 5,671,025 A | * | 9/1997 | Ryu | 348/745 |
| 6,069,607 A | * | 5/2000 | Everett et al. | 345/660 |
| 6,392,657 B1 | * | 5/2002 | Hilliard et al. | 345/589 |
| 6,532,024 B1 | * | 3/2003 | Everett et al. | 715/716 |
| 7,138,989 B2 | * | 11/2006 | Mendelson et al. | 345/204 |

* cited by examiner

*Primary Examiner*—Henry N Tran
(74) *Attorney, Agent, or Firm*—Morgan, Lewis & Bockius LLP

(57) ABSTRACT

An apparatus for testing a display device includes a display device to display test patterns, a graphic process unit to supply analog mode signals and digital mode signals to the display device, and a control unit to allow test patterns of an analog testing mode and test patterns of a digital testing mode to be sequentially displayed on the display device upon receiving a control signal from the graphic process unit, and to output a control signal to the display device to sequentially change display characteristics of an image according to an on-screen-display mode testing menus.

32 Claims, 3 Drawing Sheets

APPARATUS FOR TESTING DISPLAY DEVICE AND METHOD FOR TESTING THE SAME

The present invention claims the benefit of Korean Patent Application No. 43970/2003 filed in Korea on Jun. 30, 2003, which is hereby incorporated by reference.

BACKGROUND OF THE INVENTION

1. Field of the Invention

The present invention relates to a testing apparatus and a testing method, and more particularly, to an apparatus for testing a display device and a method for testing a display device.

2. Description of the Related Art

In general, cathode ray tube (CRT) devices are commonly used as monitor devices in televisions, measurement instruments, and information terminals. However, due to their heavy weight and a large size, the CRT devices cannot be practically used in small, light weight electronic products.

Various types of flat panel display devices have been developed to replace the CRT devices. These include liquid crystal display (LCD) devices, plasma display panel (PDP) devices, field emission display (FED) devices, and electroluminescence display (ELD) devices that are both small, light weight, and consume small amounts of power. In particular, the LCD devices have high resolution and fast reaction rates to display dynamic images.

Before the flat panel devices are fabricated into final products, they undergo final testing to display test patterns in order to check image production quality. Since the display devices are relatively mass-produced, time required for the final testing must be reduced to improve productivity.

FIG. 1 is a schematic view of a testing apparatus for a display device according to the related art. In FIG. 1, a testing apparatus includes a display device 10 for displaying test patterns, a graphic process unit 20 for supplying an analog mode signal (ANALOG_MODE) and a digital mode signal (DIGITAL_MODE) to the display device 10, a pair of first connectors 11 and 21 provided at the display device 10 and the graphic process unit 20, respectively, for transmitting and receiving the analog mode signal (ANALOG_MODE), a second pair of connectors 12 and 22 provided at the display device 10 and the graphic process unit 20, respectively, for transmitting and receiving the digital mode signal (DIGITAL_MODE), and an on-screen-display (OSD) key input unit 15 provided at the display device 10 for displaying an OSD screen on the display device 10 by a key manipulation of an inspector so that the inspector can selectively perform an analog mode testing and a digital mode testing and also selectively perform an OSD mode testing.

A testing process according to the related art includes an inspector manipulating a key of the OSD key input unit 15 to display an OSD screen on the display device 10 and to select an analog mode testing in the OSD screen. When the analog mode testing is selected, the graphic process unit 20 transmits the analog mode signal (ANALOG_MODE) to the display device 10 through the first pair of connectors 21 and 11, and the display device 10 displays test patterns according to image information of an analog signal. Accordingly, the inspector checks image quality of the displayed test patterns according to image information of an analog signal displayed on the display device 10 to determine whether it is acceptable.

Then, when the analog mode testing is completed, the inspector manipulates a key of the OSD key input unit 15 to display an OSD screen on the display device 10 and selects a digital mode testing in the OSD screen. When the digital mode testing is selected, the graphic process unit 20 transmits the digital mode signal (DIGITAL_MODE) to the display device 10 through the second pair of connectors 22 and 12, and the display device 10 displays test patterns according to image information of a digital signal. Accordingly, the inspector checks image quality of test patterns according to image information of a digital signal displayed on the display device 10 to determine whether it is acceptable.

When the digital mode testing is completed, the inspector manipulates a key of the OSD key input unit 15 to display an OSD screen on the display device 10 and selects various mode testing menus provided in the OSD screen to determine whether it is acceptable through an OSD mode testing which checks a display characteristic of the display device 10.

However, the testing apparatus according to the related art requires manual key manipulation of the inspector in order to sequentially display test patterns of the analog mode testing on the display device. In addition, the manual key manipulation is required in order to switch the analog mode testing and the digital mode testing. Moreover, the manual key manipulation is required in order to select various OSD mode testing menus provided at an OSD screen for an OSD mode testing. Accordingly, significant amounts of time is required to test the display device, thereby reducing productivity of the display devices and degrading testing reliability due to the required key manipulation of the inspector.

SUMMARY OF THE INVENTION

Accordingly, the present invention is directed to a apparatus for testing a display device and method for testing the same that substantially obviates one or more of the problems due to limitations and disadvantages of the related art.

An object of the present invention is to provide a testing apparatus for a display device capable of automatically and sequentially performing various testing modes of the display device.

Another object of the present invention is to provide a method for testing a display device capable of automatically and sequentially performing various testing modes of the display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for testing a display device includes a display device to display test patterns, a graphic process unit to supply analog mode signals and digital mode signals to the display device, and a control unit to allow test patterns of an analog testing mode and test patterns of a digital testing mode to be sequentially displayed on the display device upon receiving a control signal from the graphic process unit, and to output a control signal to the display device to sequentially change display characteristics of an image according to an on-screen-display mode testing menu.

In another aspect, a method for testing a display device includes transmitting analog mode signals and digital mode signals to a display device, sequentially displaying test patterns of an analog mode testing and test patterns of digital mode testing on the display device and sequentially changing display characteristics of an image according to on-screendisplay mode testing menus, and checking image quality of the test patterns of the analog mode testing and the test patterns of the digital mode testing that are sequentially displayed on the display device, and checking the display characteristics of the image according to the on-screen-display mode testing menus which are sequentially changed at the display device.

In another aspect, a testing apparatus includes a display device displaying test patterns, a graphic process unit supplying analog mode signals and digital mode signals to the display device, and a control unit receiving a control signal from the graphic process unit to sequentially displaying test patterns of an analog testing mode and test patterns of a digital testing mode on the display device, the control unit outputting a control signal to the display device to sequentially change display characteristics of an image according to mode testing menus.

In another aspect, a method for testing a display device includes transmitting analog mode signals and digital mode signals to a display device, sequentially displaying test patterns of an analog mode testing and a test patterns of digital mode testing on the display device and sequentially changing display characteristics of an image according to on-screen-display mode testing menus, inspecting image quality of the sequentially displayed test patterns of the analog mode testing and the test patterns of the digital mode, and inspecting the display characteristics of the image according to the on-screen-display mode testing menus displayed on the display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
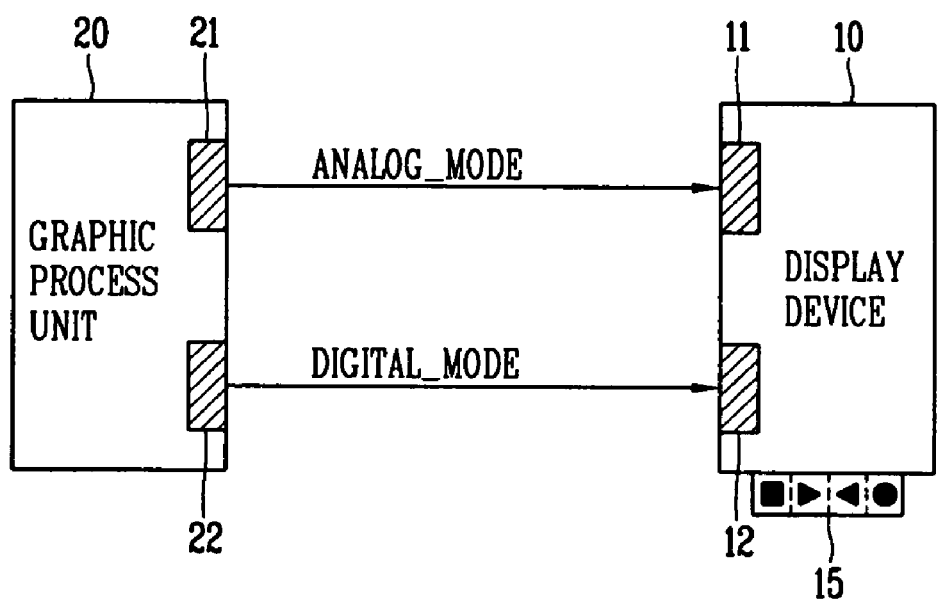
FIG. 1 is a schematic view of a testing apparatus for a display device according to the related art.
Figure 2:
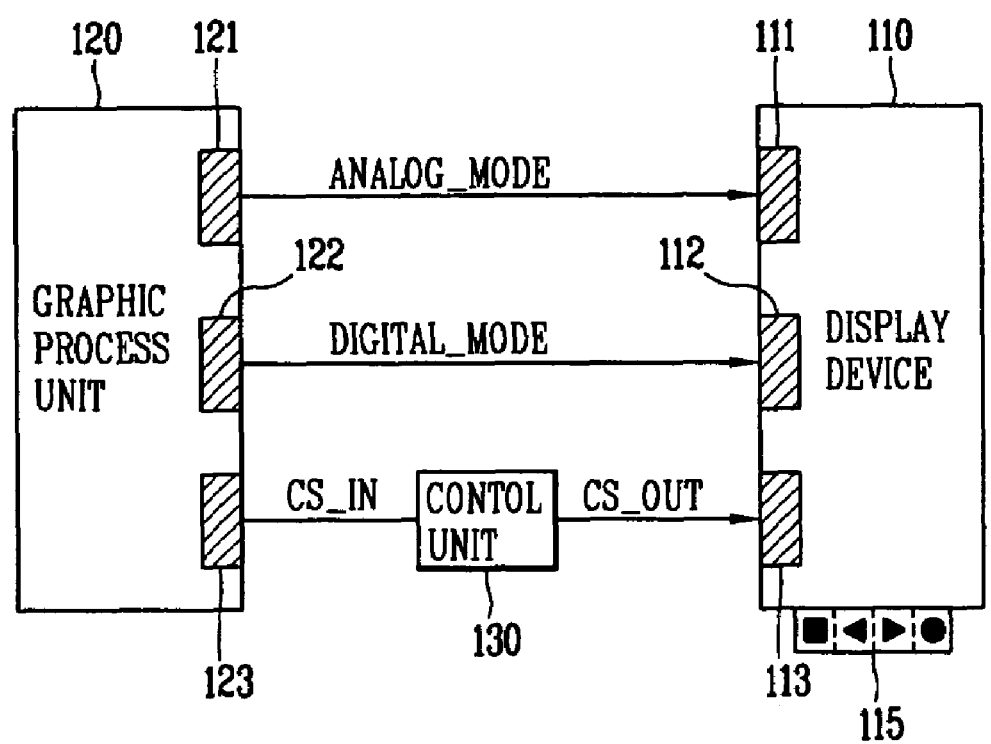
FIG. 2 is a schematic view of an exemplary testing apparatus for a display device according to the present invention.

FIG. 2 is a schematic view of an exemplary testing apparatus for a display device according to the present invention. In FIG. 2, an exemplary testing apparatus for a display device may include a display device 110 to display a plurality of different test patterns, a graphic process unit 120 to supply analog mode signals (ANALOG_MODE) and digital mode signals (DIGITAL_MODE) to the display device 110, a first pair of connectors 111 and 121 provided at the display device 110 and the graphic process unit 120, respectively, to transmit and receive the analog mode signals (ANALOG_MODE), a second pair of connectors 112 and 122 provided at the display device 110 and the graphic process unit 120, respectively, to transmit and receive the digital mode signals (DIGITAL_MODE), an input unit 115 provided at the display device 110 to display information on the display device 10 to selectively perform analog mode testing, digital mode testing, and OSD mode testing, a control unit 130 to allow test patterns of the analog testing mode and test patterns of the digital testing mode to be sequentially displayed on the display device 110 upon receiving a control signal (CS_IN) from the graphic process unit 120, and to output a control signal (CS_OUT) to the display device 110 to sequentially change a display characteristic of an image according to OSD mode testing menus, and a third pair of connectors 113 and 123 provided at the display device 110 and the graphic process unit 120, respectively, to transmit and receive the control signals (CS_IN, CS_OUT).

Figure 3:
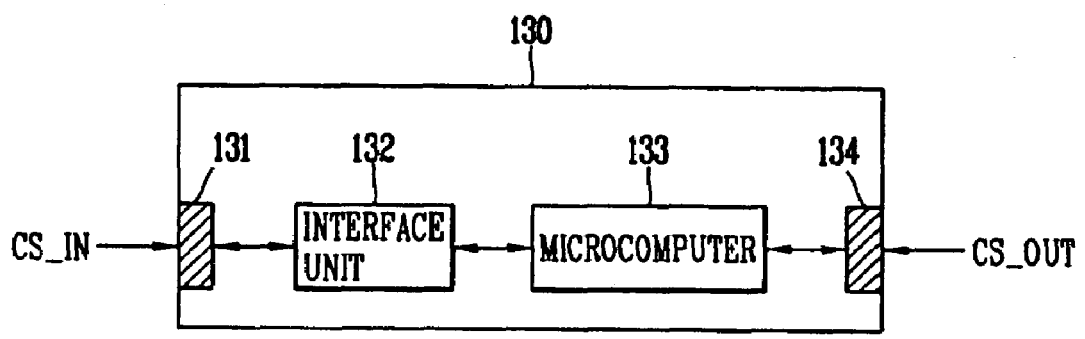
FIG. 3 is a schematic view of an exemplary control unit according to the present invention.

FIG. 3 is a schematic view of an exemplary control unit according to the present invention. In FIG. 3, a control unit 130 may includes a microcomputer 133 to allow test patterns of the analog testing mode and test patterns of the digital testing mode to be displayed on the display device 110 upon receiving acontrol signal (CS_IN), which is supplied by the graphic process unit 120 and through an interface unit 132 to supply an output control signal (CS_OUT) to the display device 110, thereby sequentially changing display characteristics of an image according to OSD mode testing menus. In addition, a fourth pair of connectors 131 and 134 may receive a control signal (CS_IN) from the graphic process unit 120 and may output the control signal (CS_OUT) to the display device 110.

An exemplary testing process of a display device may include supplying the control signal (CS_IN) according to a manual mode to the control unit 130 by the graphic process unit. For example, keys of the OSD key input unit 115 may be manipulated to display an OSD screen on the display device 110 and to select an analog mode testing in the OSD screen (in FIG. 2).

When the analog mode testing is selected, the graphic process unit 120 may transmit the analog mode signals (ANALOG_MODE) to the display device 110 through the first pair of connectors 121 and 111. Then, the display device 110 may display test patterns according to image information of analog signals.

Accordingly, image quality of the test patterns may be reviewed according to the image information of the analog signals displayed on the display device 110 to determine whether they are acceptable.

When the analog mode testing is completed, the OSD key input unit 115 may be manipulated to display an OSD screen on the display device 110 and may select a digital mode testing at the OSD screen. When the digital mode testing is selected, the graphic process unit 120 may transmit the digital mode signals (DIGITAL_MODE) to the display device 110 through the second pair of connectors 122 and 112. Then, the display device 110 may display test patterns according to image information of digital signals.

Accordingly, the image quality of the test patterns may be reviewed according to the image information of the digital signals displayed on the display device 110 to determine whether they are acceptable.

When the digital mode testing is completed, the OSD key input unit 115 may be manipulated to display an OSD screen on the display device 110 and may select various OSD mode testing menus provided at the OSD screen to determine whether they are acceptable through an OSD mode testing which may check display characteristics of the display device 110.

When the graphic process unit 120 supplies the control signal (CS_IN) according to an automatic mode to the control unit 130, the display device 110 automatically and sequentially displays test patterns of the analog testing mode and test patterns of the digital testing mode by the control signal (CS_OUT) output from the control unit 130. Then, the graphic process unit 120 may sequentially change display characteristics of an image in accordance with OSD mode testing menus.

For example, when the control signal (CS_OUT) according to an automatic mode is supplied to the display device 110 from the control unit 130, the analog mode testing may be selected first. Then, the graphic process unit 120 may transmit the analog mode signals (ANALOG_MODE) to the display device 110 through the first pair of connectors 121 and 111. Next, the display device 110 may sequentially display test patterns according to image information of analog signals.

Accordingly, the image quality of the test patterns may be checked according to the image information of the analog signals displayed on the display device 110 to determine whether they are acceptable.

When the analog mode testing is completed, the digital mode testing may be selected. Then, the graphic process unit 120 may transmit the digital mode signals (DIGITAL_MODE) to the display device 110 through the second pair of connectors 122 and 112. Next, the display device 110 may sequentially display test patterns according to image information of the digital signals.

Accordingly, the image quality of the test patterns may be checked according to the image information of the digital signals displayed on the display device 110 to determine whether they are acceptable.

When the digital mode testing is completed, the OSD mode testing may be automatically performed to sequentially change display characteristics of the display device 110 according to various OSD mode testing menus. Accordingly, the display characteristics of the image displayed on the display device 110 may be detected according to various OSD mode testing menus to determine whether they are acceptable.

If a test pattern displayed on the display device 110 is not acceptable while the analog mode testing and the digital mode testing are automatically performed, the automatic mode may be stopped by using a dedicated input device, thereby converting the mode into a manual mode to precisely check the test pattern which is unacceptable. Likewise, if the display characteristics of the display device 110 are not acceptable while the OSD mode testing is automatically performed, the automatic mode may be stopped by using a dedicated input device, thereby converting the mode into the manual mode to precisely check the unacceptable display characteristics.

In addition, a display order and display time of the test patterns displayed through the display device 110 in the analog mode testing and the digital mode testing may be varied. Moreover, a performance order and performance time of various OSD mode testing menus used for the OSD mode testing may be varied and edited in order to improve efficiency of the testing. Although not shown, an information window may display on the display device 110 to show detailed information about test patterns of the analog-testing mode and test patterns of the digital-testing mode.

In addition, the display device 110 may include various display devices, such as CRT devices, LCD devices, PDP devices, FED devices, and ELD devices. When an LCD device is supplied as the display device 110, the analog mode signals (ANALOG_MODE) may be converted into digital signals and data processing may be performed. Then, the digital signals may be converted back into analog signals, and the analog signals may be supplied to an LCD panel. Next, the digital mode signals (DIGITAL_MODE) may be converted to analog signals after the data processing, and the analog signals may be supplied to the LCD panel.

In addition, when the LCD device is supplied as the display device 110, test patterns of the analog testing mode and test patterns of the digital testing mode may be set to have various forms and may be displayed as one of white, black, red, green, and blue patterns. In addition, patterns may be produced by combining a plurality of colors or when patterns are produced having one gray level, a plurality of gray levels, or a gray level gradually changed along one direction of an image.

According to the present invention, a testing apparatus of a display device and a method for testing a display device may automatically and sequentially perform analog mode testing, digital mode testing, and OSD mode testing for a display device. Accordingly, time required for testing the display device may be reduced and reliability of the display devices may be improved. In addition, by preventing key manipulation errors, testing reliability may be improved. Moreover, a single inspector may easily perform analog mode testing, digital mode testing, and OSD mode testing, thereby reducing labor costs and production costs of the display device.

It will be apparent to those skilled in the art that various modifications and variations can be made in the apparatus for testing display device and method for testing the same of the present invention without departing from the spirit or scope of the invention. Thus, it is intended that the present invention cover the modifications and variations of this invention provided they fall within the scope of the appended claims and their equivalents.

What is claimed is:

1. An apparatus for testing a display device, comprising:
   a display device to display test patterns;
   a graphic process unit to supply analog mode signals and digital mode signals to the display device; and
   a control unit to allow test patterns of an analog testing mode and test patterns of a digital testing mode on the display device upon receiving a first control signal from the graphic process unit, and to output a second control signal to the display device to sequentially change display characteristics of an image according to an on-screen-display mode testing menu,
   wherein the test patterns of the digital testing mode is displayed after the display of the test pattern of the analog testing mode is terminated.

2. The apparatus according to claim 1, further comprising:
   a first pair of connectors provided at the display device and the graphic process unit to transmit and receive the analog mode signals;
   a second pair of connectors provided at the display device and the graphic process unit to transmit and receive the digital mode signals; and
   a third pair of connectors connected to the display device and the graphic process unit to transmit and receive the first and second control signals.

3. The apparatus according to claim 1, further comprising an input unit to display an on-screen-display screen on the display device by manipulation of the input unit.

4. The apparatus according to claim 3, wherein the input unit includes an on-screen-display key input unit and manipulation of the input unit is performed by an operator.

5. The apparatus according to claim 4, wherein the on-screen-display key input unit controls the display device so that an analog mode testing, a digital mode testing, and an on-screen-display mode testing are selectively performed by a key manipulation of the operator.

6. The apparatus according to claim 1, wherein the control unit comprises a microcomputer to allow the test patterns of the analog testing mode and the test patterns of the digital testing mode to be sequentially displayed on the display device upon receiving the first control signal that is supplied through the graphic process unit and an interface unit, and to output the second control signal to the display device to sequentially change the display characteristics of the image according to the on-screen-display mode testing menus.

7. The apparatus according to claim 6, wherein the control unit further comprises a fourth pair of connectors to receive the first control signal from the graphic process unit and output the second control signal to the display device.

8. The apparatus according to claim 1, wherein information about the test patterns of the analog testing mode and the test patterns of the digital testing mode is displayed in an information window on the display device.

9. The apparatus according to claim 1, wherein the display device is one selected from a group comprising a cathode ray tube device, a liquid crystal display device, a plasma display panel device, a field emission display device, and an electroluminescence display device.

10. A method for testing a display device, comprising:
transmitting analog mode signals and digital mode signals to a display device;
sequentially displaying test patterns of an analog mode testing and a test patterns of digital mode testing on the display device and sequentially changing display characteristics of an image according to on-screen-display mode testing menus; and
checking image quality of the test patterns of the analog mode testing and the test patterns of the digital mode testing that are sequentially displayed on the display device, and checking the display characteristics of the image according to the on-screen-display mode testing menus which are sequentially changed at the display device,
wherein the test patterns of the digital testing mode is displayed after the display of the test pattern of the analog testing mode is terminated.

11. The method according to claim 10, wherein the test pattern of the analog mode testing, the test pattern of the digital mode testing, display order and display time of the test patterns of the analog and digital mode testing are able to be changed by an operator.

12. The method according to claim 10, wherein the on-screen-display mode testing menus, performance order, and performance time of the on-screen-display mode testing menus are able to be changed by an operator.

13. The method according to claim 10, further comprising:
stopping a testing when the displayed test patterns are unacceptable while the analog mode testing and the digital mode testing are sequentially performed; and
inspecting the displayed test patterns that are unacceptable.

14. The method according to claim 10, further comprising:
stopping a testing when the display characteristics of the display device are unacceptable while the on-screen-mode testing is sequentially performed; and
inspecting the display characteristics that are unacceptable.

15. The method according to claim 10, further comprising converting the analog mode signals into digital signals to perform data processes, converting the data processed digital signals into analog signals, and supplying the analog signals to the display device.

16. The method according to claim 10, further comprising converting the digital mode signals into analog signals after performing data processes, and supplying the analog signals to the display device.

17. A testing apparatus, comprising:
a display device displaying test patterns;
a graphic process unit supplying analog mode signals and digital mode signals to the display device; and
a control unit receiving a first control signal from the graphic process unit to sequentially display test patterns of an analog testing mode and test patterns of a digital testing mode on the display device, the control unit outputting a second control signal to the display device to sequentially change display characteristics of an image according to mode testing menu, wherein the test patterns of the digital testing mode is displayed after the display of the test pattern of the analog testing mode is terminated.

18. The apparatus according to claim 17, further comprising a pair of connectors connected to the display device and the graphic process unit to transmit and receive the first and second control signals.

19. The apparatus according to claim 17, further comprising an input unit to display an on-screen-display screen on the display device by manipulation of the input unit.

20. The apparatus according to claim 19, wherein the input unit includes an on-screen-display key input unit and manipulation of the input unit is performed by an operator.

21. The apparatus according to claim 20, wherein the on-screen-display key input unit controls the display device so that an analog mode testing, a digital mode testing, and an on-screen-display mode testing are selectively performed by a key manipulation of the operator.

22. The apparatus according to claim 17, wherein the control unit comprises a microcomputer to allow the test patterns of the analog testing mode and the test patterns of the digital testing mode to be sequentially displayed on the display device upon receiving the first control signal that is supplied through the graphic process unit and an interface unit, and to output the second control signal to the display device to sequentially change the display characteristics of the image according to the on-screen-display mode testing menus.

23. The apparatus according to claim 22, wherein the control unit further comprises another pair of connectors to receive the first control signal from the graphic process unit and output the second control signal to the display device.

24. The apparatus according to claim 17, wherein information about the test patterns of the analog testing mode and the test patterns of the digital testing mode is displayed in an information window on the display device.

25. The apparatus according to claim 17, wherein the display device includes one of a cathode ray tube device, a liquid crystal display device, a plasma display panel device, a field emission display device, and an electroluminescence display device.

26. A method for testing a display device, comprising:
transmitting analog mode signals and digital mode signals to a display device;
sequentially displaying test patterns of an analog mode testing and test patterns of digital mode testing on the display device and sequentially changing display characteristics of an image according to on-screen-display mode testing menus;

inspecting image quality of the sequentially displayed test patterns of the analog mode testing and the test patterns of the digital mode; and inspecting the display characteristics of the image according to the on-screen-display mode testing menus displayed on the display device, wherein the test patterns of the digital testing mode is displayed after the display of the test pattern of the analog testing mode is terminated.

27. The method according to claim 26, wherein the test pattern of the analog mode testing, the test pattern of the digital mode testing, display order and display time of the test patterns of the analog and digital mode testing are changeable.

28. The method according to claim 26, wherein the on-screen-display mode testing menus, performance order, and performance time of the on-screen-display mode testing menus are changeable.

29. The method according to claim 26, further comprising:

determining acceptability of the displayed test patterns during the analog mode testing and the digital mode testing;

stopping a test when the display test patterns are unacceptable; and inspecting the displayed test patterns that are unacceptable.

30. The method according to claim 26, further comprising:

determining acceptability of the display characteristics of the display device during the on-screen-mode testing;

stopping testing when the display characteristics are unacceptable; and inspecting the display characteristics that are unacceptable.

31. The method according to claim 26, further comprising converting the analog mode signals into digital signals to perform data processes, converting the data processed digital signals into analog signals, and supplying the analog signals to the display device.

32. The method according to claim 26, further comprising converting the digital mode signals into analog signals after performing data processes, and supplying the analog signals to the display device.

* * * * *